United States Patent [19]
Norell et al.

[11] Patent Number: 4,678,653
[45] Date of Patent: Jul. 7, 1987

[54] PROCESS FOR PREPARING CHLORINE DIOXIDE

[75] Inventors: Maria G. Norell; Johan C. Wanngård, both of Sundsvall, Sweden

[73] Assignee: KemaNord AB, Stockholm, Sweden

[21] Appl. No.: 726,330

[22] Filed: Apr. 23, 1985

[30] Foreign Application Priority Data

Apr. 1, 1985 [SE] Sweden .................................. 8501615

[51] Int. Cl.⁴ ........................ C01B 7/01; C01B 11/02; C01B 17/74
[52] U.S. Cl. .................................. 423/478; 423/486; 423/529; 423/531
[58] Field of Search ............... 423/478, 486, 522, 529, 423/531

[56] References Cited

U.S. PATENT DOCUMENTS

| 3,714,040 | 1/1973 | Jordan et al. ...................... 423/522 |
| 3,864,456 | 2/1975 | Winfield et al. ..................... 423/478 |
| 4,086,329 | 4/1978 | Cowley et al. ...................... 423/478 |
| 4,393,035 | 7/1983 | Fredette ............................. 423/522 |
| 4,393,036 | 7/1983 | Fredette ............................. 423/478 |
| 4,508,593 | 4/1985 | Bergstrom .......................... 423/486 |

OTHER PUBLICATIONS

*Momentum, Heat, and Mass Transfer*, 2nd Ed., C. O. Bennett & J. E. Myers, McGraw-Hill Book Co., 1974, pp. 687, 703.

Primary Examiner—John Doll
Assistant Examiner—Jeffrey Edwin Russel
Attorney, Agent, or Firm—Fred Philpitt

[57] ABSTRACT

A process for production of chlorine dioxide and chlorine by reacting sodium chlorate with chloride ions and sulfuric acid where the chlorine ions partly are obtained from hydrochloric acid is described. In the process chlorine obtained as a by-product is reacted with sulfur dioxide in a reactor equipped with a condenser. The heat of reaction is removed by keeping the reactor at or above the boiling point of the reaction medium and the vapors are condensed in the condenser and brought back to the reactor. The obtained mixed acid comprising sulfuric acid and hydrochloric acid is returned to the chlorine dioxide reactor.

3 Claims, 1 Drawing Figure

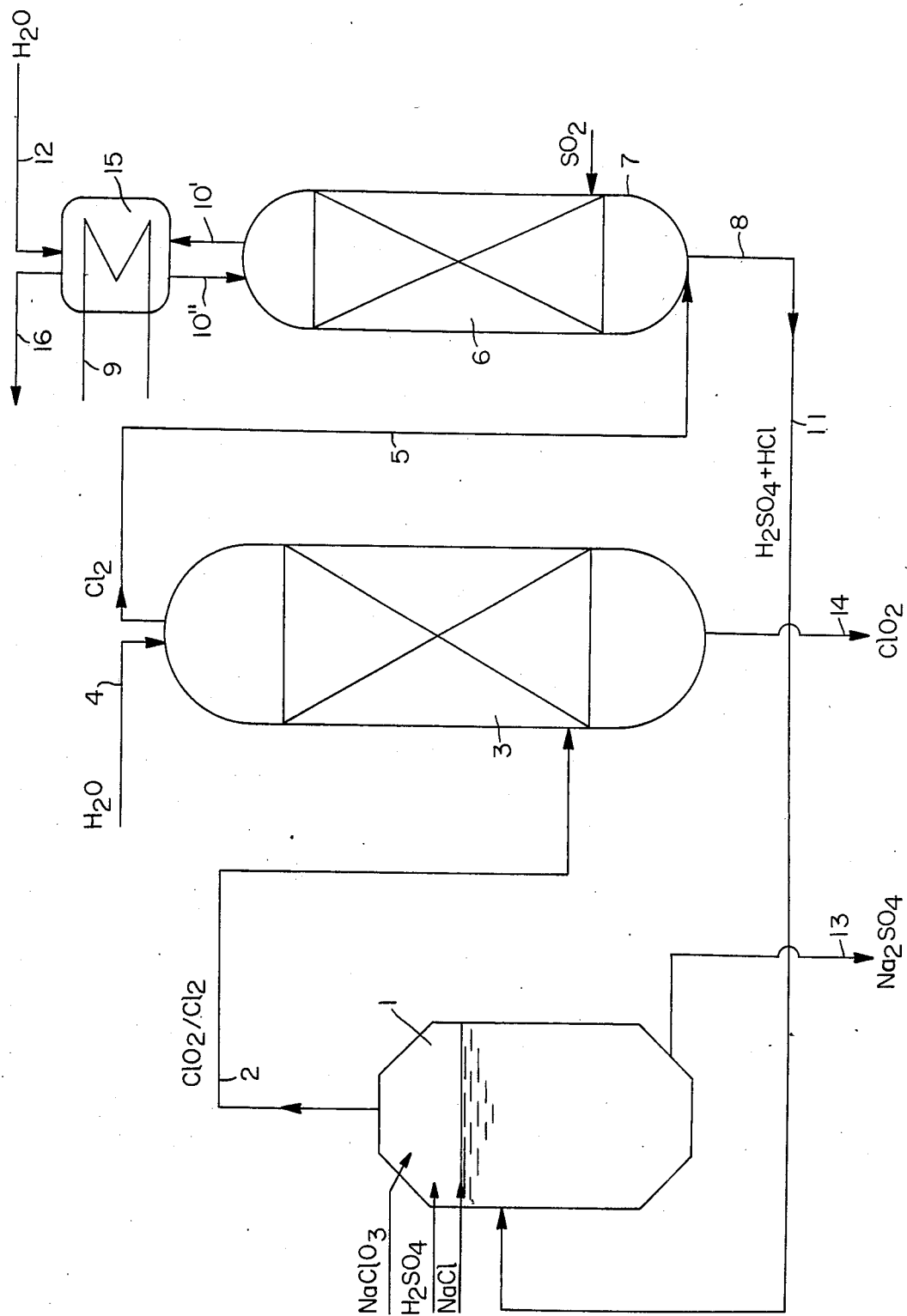

PROCESS FOR PREPARING CHLORINE DIOXIDE

TECHNICAL FIELD

The present invention relates to a process for preparing chlorine dioxide by reaction of a chlorate, a chloride and a mineral acid. More specifically the invention relates to the production of mixed mineral acid to be used in the process.

BACKGROUND ART OF THE INVENTION

Chlorine dioxide used as an aqueous solution is of considerable commercial interest and importance, mainly in the area of pulp bleaching but also in water purification, fat bleaching, removal of phenols from industrial wastes, etc. It is therefore desirable to provide processes by which the chlorine dioxide can be efficiently produced.

The predominant chemical reaction involved in such processes is summarized by the formula $$ClO_3^- + Cl^- + 2H^+ \rightarrow ClO_2 + \tfrac{1}{2}Cl_2 + H_2O \qquad (1)$$

The chlorate ions are provided by alkali metal chlorate, preferably sodium chlorate, the chloride ions by alkali metal chloride, preferably sodium chloride, or by hydrogen chloride, and the hydrogen ions by mineral acids, normally sulfuric acid and/or hydrochloric acid.

There are also competing reactions which decrease the efficiency of the formation of chlorine dioxide from chlorate ions, the main reaction being represented by the formula $$ClO_3^- + 6H^+ + 5Cl^- \rightarrow 3Cl_2 + 3H_2O \qquad (2)$$

The efficiency of commercial processes, such as the SVP process (SVP is a registered Trade Mark owned by KemaNord, Sweden) are normally above 90% and preferably above 95%, which means that the competing reaction represented by formula (2) is very much suppressed.

Processes for producing chlorine dioxide are set forth in e.g. U.S. Pat. Nos. 3,563,702 and 3,864,456, which are hereby incorporated by reference, comprising continuously feeding to a single vessel generator-evaporator-crystallizer alkali metal chlorate, an alkali metal chloride and mineral acid solutions in proportions sufficient to generate chlorine dioxide and chlorine, at a temperature of from about 50 to about 100 degrees centigrade, and an acidity of from about 2 to about 12 normal, with or without a catalyst, removing water by vacuum-induced evaporation at about 100–400 millimeters of mercury absolute, with concurrent withdrawal of chlorine dioxide and chlorine, crystallizing the salt of the mineral acid within the generator and withdrawing the crystals from the vessel.

In those reaction systems wherein the acid normality is maintained between about 2 and 4.8, the reaction may be carried out in the presence of a relatively small amount of a catalyst, such as those selected from the group consisting of vanadium pentoxide, silver ions, manganese ions, dichromate ions and arsenic ions.

As the reaction occurs within the generator in producing chlorine dioxide from sodium chlorate and sodium chloride, where sulfuric acid is employed as a mineral acid reactant, crystals of sodium sulfate are crystallized and withdrawn in the form of a slurry. The main reaction is shown by the formula $$NaClO_3 + NaCl + H_2SO_4 \rightarrow ClO_2 + \tfrac{1}{2}Cl_2 + Na_2SO_4 + H_2O \qquad (3)$$

Sodium sulfate is a valuable by-product useful in kraft pulping operation. It is used in the chemical recovery system in order to cover losses of sulfur and sodium.

In some cases, however, the requirement for sodium sulfate is greatly reduced or obviated. In certain kraft mill operations, the requirements for sodium sulfate may be reduced or varied. While the requirement for reduced quantities of sodium sulfate may vary, the requirement for the chlorine dioxide remains or even increases.

In order to reduce the quantities of sodium sulfate it has been suggested in U.S. Pat. No. 3,933,987 to substitute part of the sodium chloride with hydrochloric acid as a source for the reducing agent. Here, the hydrochloric acid serves the dual function as a reducing agent and as a portion of the mineral acid. By using the combination of sulfuric acid and hydrochloric acid the amount of precipitated sodium sulfate can be effectively controlled and reduced. When one mole of hydrochloric acid and half a mole of sulfuric acid are used, the amount of precipitated sodium sulfate is reduced by 50% compared to the mode when all chloride ions are added as sodium chloride, as can be seen by comparing formula (3) with the following formula:

$$NaClO_3 + HCl + \tfrac{1}{2}H_2SO_4 \rightarrow ClO_2 + \tfrac{1}{2}Cl_2 + \tfrac{1}{2}Na_2SO_4 + H_2O \qquad (4)$$

The main reactions for the chlorine dioxide production always also produce half a mole of chlorine per mole of chlorine dioxide, see formulas (1), (3) and (4). An additional small amount of chlorine is also produced by the side reaction according to formula (2). This chlorine product has formerly been used as such in the paper mills as a bleaching agent in aqueous solution, or it has been reacted with sodium hydroxide to form sodium hypochlorite and used as a bleaching agent. Today there is a tendency towards a more extensive chlorine dioxide bleaching and thus a decreasing need for chlorine and hypochlorite as bleaching agents. Another disadvantage with by-product chlorine is that the concentration of the chlorine solution is very low, normally 1–5 g/l. Because of the large amount of water, modern bleaching systems cannot use the by-product chlorine in the chlorination stage. This means that many pulp mills consider the chlorine as a by-product of limited value.

In order to make the chlorine dioxide process more attractive, it has been suggested that the amount of chlorine leaving the plant can be reduced by reacting the by-product chlorine with sulfur dioxide and producing a mixture of sulfuric acid and hydrochloric acid according to the formula $$Cl_2 + SO_2 + 2H_2O \rightarrow 2HCl + H_2SO_4 \qquad (5)$$

The produced mixed acid can thereafter be used directly as acid feed to the chlorine dioxide reactor operating in a partial hydrochloric acid mode according to formula (4).

Such processes have been previously described in U.S. Pat. No. 3,347,628 and Swedish published patent application No. 8103892. In U.S. Pat. No. 4,086,329 a balanced process is described, where just sufficient sulfuric acid is produced according to formula (5) in order to get the exact need of sulfate ions to be combined with the sodium ions introduced to the chlorine dioxide generating system with the sodium chlorate.

The reaction of sulfur dioxide and chlorine obtained in the chlorine dioxide generating process is also disclosed in U.S. Pat. No. 3,393,036. Here the reaction is effected in an aqueous medium at a temperature below the boiling point of water. In order to accomplish this, the reaction is carried out in a cooled falling film tower having integral cooling passages or in a packed bed tower with a substantial portion of the produced mixed acid being recycled through an external heat exchanger. This patent shows the difficulties in controlling the exothermic reaction of chlorine and sulfur dioxide.

In the manufacturing of mixed acid from chlorine and sulfur dioxide by their reaction with water there are two main factors to consider: (i) The process is strongly exothermic with a ΔH reaction around 80 kcal/mol and thus requires an effective cooling. (ii) The gaseous reactants must be transferred to the liquid phase and there react with each other and water, thus an effective mass transfer is necessary in order to obtain acceptable yields.

In the U.S. Pat. No. 4,393,036 an extensive cooling has been accomplished by either external or internal cooling with a cooling agent. This requires either recirculation through a heat exchanger by the aid of an external pump or a complicated apparatus with a manifold of internal cooling channels through which the cooling agent is circulated. In the later case there is a risk of leakage because of the corrosive mixed acid and the leakage can lead to contamination of the cooling water.

SUMMARY OF THE INVENTION

According to the invention a mixed acid for use in chlorine dioxide production is obtained by reacting by-product chlorine from the chlorine dioxide process with sulfur dioxide in a reactor equipped with a condenser. The removal of the heat generated by the reaction is effected by inducing an endothermic process in the reactor solution in the same vessel as the major part of the reaction occurs. The endothermic process is evaporation of water through boiling of the reaction mixture which requires energy in the form of heat of evaporation. Thus an evaporative cooling is obtained which easily can be controlled with the aid of a pressure control in the reactor so that a balance between liberated heat and cooling is obtained.

The process according to the present invention is described in the accompanied claims.

Water vapor is formed in successively increasing amount upwards in the reactor at the same time as the gaseous reactants are consumed. This leads to a leveling out of the gaseous load in the reactor compared to a process in which no boiling occurs, and thus a more effective mass transfer which leads to reduced height of transfer units.

GENERAL DESCRIPTION OF THE INVENTION

The water vapor liberated during the boiling process is condensed and optionally cooled in a condenser at the top of the reactor. In order to obtain a good water balance in the process a part of or all of this condensed water is fed at the top of the reactor. In practical operation it is desirable to re-cycle between 50–100% of the condensed water, preferably between 80–100%. The required fresh water is added at the top of the condenser. The condenser is designed so that it can absorb and react optional residual unreacted chlorine, sulfur dioxide and hydrogen chloride and therefore also have the function of a tail gas scrubber. Due to the condensation of water vapor in the condensor the liquid load in this is increased and thus the effectivity in the absorption of unreacted gases and hydrogen chloride is increased.

Cold water is added which is especially advantageous since the gas-liquid equilibria for chlorine, hydrochloric acid and sulfur dioxide are strongly temperature dependent and the corresponding equilibrium constants $$K_{Cl_2}=[Cl_2(g)]/[Cl_2(aq)]$$

$$K_{HCl}=[HCl(g)]/[HCl(aq)]$$

$$K_{SO_2}=[SO_2(g)]/[SO_2(aq)]$$

decrease with decreasing temperature.

The equilibrium constants are also dependent on the acidity and ion strength of the aqueous phase in a complex way. Since chlorine and sulfur dioxide equilibrium constants decrease with increasing hydrochloric acid strength in the range of concentration of mixed acid normally produced, but increase with increasing sulfuric acid strength and the hydrochloric acid equilibrium constant increases with acidity it has been found advantageous to keep the acidity low by addition of water in the upper part of the tail tower. Normally all fresh water is added to the condenser, although minor amounts of the requirement, and up to 15%, can be added to the reactor. The amount of water added should correspond to the amount consumed by the reaction, withdrawn by the mixed acid and vented off as steam.

The heat of reaction is removed by evaporation of 0.15–0.35 parts by weight of water, preferably 0.18–0.30 parts by weight, based on each part by weight of the mixed acid produced.

The process also offers an excellent possibility of recovering high value energy in the form of steam or hot water from the condenser. This is extremely valuable since the process for production of chlorine dioxide consumes a large amount of steam. It is thus advantageous either directly or indirectly, by the aid of a heat pump, to use the energy from the mixed acid production step in the chlorine dioxide generator reactor. One way of doing this is to preheat the chemical feeds to the chlorine dioxide generator by using these feeds to condense the water vapor in the tail gas scrubber on the reactor. vapor in the tail gas scrubber on the reactor.

The steam requirement in the chlorine dioxide reactor is also reduced because the mixed acid produced has a higher temperature and lower water content according to the invention in comparison with prior art processes.

Although boiling occurs in the reactor for production of mixed acid it is understood that both liquid and gaseous phases exist along the height of the reactor and move countercurrently so that the gaseous phase moves upwards through the reactor and the liquid phase downwards.

The boiling temperature varies with the strength of the mixed acid. At ambient pressure, the boiling point of 12N mixed acid containing 17.5% hydrochloric acid and 23.5% sulfuric acid is 108° to 109° C. The reaction is normally carried out at ambient pressure, but moderately sub or super atmospheric pressures can be used.

According to a preferred embodiment of the present invention the mixture of sulfuric acid and hydrochloric acid to be used in a chlorine dioxide reactor is produced by reacting chlorine, including at least the chlorine obtained after the chlorine dioxide absorption step, and sulfur dioxide in at least two reaction zones. In the bottom of the primary zone the total amount of sulfur dioxide needed for the mixed acid production is introduced in an aqueous mixture of sulfuric and hydrochloric acid containing dissolved chlorine and gaseous chlorine. The mixed acid produced in the primary reaction zone contains dissolved quantities of sulfur dioxide and is forwarded to the secondary reaction zone. Chlorine is introduced into the lower part of the secondary reaction zone, and preferably in the bottom of this zone. The amount introduced can be the total amount of chlorine to be used in the production of the mixed acid for the chlorine dioxide reactor, or it can be a part of that amount, the balance being introduced in the primary reaction zone. The amount should be large enough for a gaseous chlorine phase to leave the secondary reaction zone. The produced mixed acid is withdrawn from the lower part, and preferably the bottom of the secondary reaction zone. At least a part of the mixed acid is introduced into the chlorine dioxide reactor.

By using this process the amount of residual sulfur dioxide in the mixed acid can be effectively controlled and reduced to a minimum.

Sulfur dioxide is a reducing agent which can interact with the chloride ion as reducing agent in the reaction, and thus leads to imbalance in the reaction and to a decrease in efficiency. It has also been observed that sulfur dioxide dissolved in the mixed acid forwarded to the chlorine dioxide reactor might have a detrimental effect on the morphology of the sodium sulfate crystals precipitated in the process. This is due to the reducing effect of sulfur dioxide on dichromate ions. The dichromate ions can be present in the cell liquor from a chlorate cell, which cell liquor is used as the source of sodium chlorate feed to the reactor. These dichromate ions are reduced to trivalent chromium which causes the sodium sulfate to precipitate as very fine crystals which might be difficult to separate from the reaction medium.

The chlorine introduced in the secondary reaction zone is rapidly dissolved in the mixed acid and the reaction takes place in the aqueous phase. It has also been found that the chlorine introduced into the secondary reaction zone has another beneficial effect on the sulfur dioxide content of the mixed acid from the primary reaction zone. Gaseous chlorine, and air contained therein, causes the dissolved sulfur dioxide to be physicochemically desorbed from the mixed acid. The reactions in the secondary reaction zone can thus be represented by the following formulas:

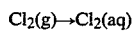

$Cl_2(g) \rightarrow Cl_2(aq)$

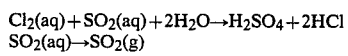

$Cl_2(aq) + SO_2(aq) + 2H_2O \rightarrow H_2SO_4 + 2HCl$
$SO_2(aq) \rightarrow SO_2(g)$ In order to ensure that all residual sulfuric dioxide in the mixed acid is stripped off it is necessary to charge chlorine to the secondary reaction zone in such an amount that gaseous chlorine leaves the secondary reaction zone.

Although the liquid and gaseous phases are brought into contact countercurrently in both the primary and secondary reaction zones, the net transport of chlorine and sulfur dioxide is cocurrent from the gaseous phase to the liquid phase in the primary reaction zone and countercurrent in the secondary reaction zone in which chlorine moves from the vapour phase to the liquid phase and sulfur dioxide moves from the liquid phase to the vapour phase.

According to one embodiment of the invention the primary reaction zone and secondary reaction zone are contained in one vessel. The mixed acid flows downward in the vessel and is withdrawn at the bottom of the vessel. At least a portion of the chlorine is introduced in the bottom or lowest part of the vessel. The chlorine is added in such an amount that it leaves the secondary reaction zone as a gaseous phase and preferably constitutes a continuous phase in the secondary reaction zone.

The minimum height of the secondary reaction zone (H) is determined by the number of transfer units (N) and the height of each transfer unit required for reaction of the amount of chlorine which stoichiometrically corresponds to the desired reduction of the residual sulfur dioxide which is not desorbed from the mixed acid. This can be calculated in a known manner and depends on the type of reaction vessel, the gas flows and the flow rate and strength of the mixed acid as well as the temperature of the mixed acid.

The sulfur dioxide inlet in a single vessel reactor is situated immediately above the secondary reaction zone. If further chlorine is added to the primary reaction zone it is suitable to add it here. The sulfur dioxide is thus introduced in the bottom of the primary reaction zone and sulfur dioxide and at least chlorine from the secondary reaction zone are dissolved in the aqueous mixed acid phase, where the reaction to hydrochloric acid and sulfuric acid takes place, thus increasing the strength of the mixed acid. In the same way as in the secondary reaction zone the height of the primary reaction zone is determined depending of the type of reactor, the gas flows and flow rate, temperature and strength of the mixed acid.

The strength of the mixed acid produced is determined by the relation of the flow rates of the added water, chlorine and sulfur dioxide and exhausts losses. As the mixed acid should be reintroduced into the chlorine dioxide reactor, wherein water is evaporated from the reaction medium in order to keep a constant volume in the reactor, too weak acid solution must be avoided. A suitable acid normality of the sulfuric and hydrochloric acid is within the interval of 6 to 14 and preferably of 7 to 12.

Normally the amount of mixed acid produced according to the invention corresponds to the amount obtained by reacting the by-product chlorine from the chlorine dioxide process which is obtained from the chloride dioxide absorption step. It is, however, also possible to add further chlorine to the mixed acid production process. Preferably any additional chlorine is added to the stream of chlorine coming from the chlorine dioxide absorption step.

The chlorine from the chlorine dioxide absorption step may contain air or inert gases from the chlorine dioxide reaction, such as nitrogen, which also can be introduced into the vessel. This flow of inert gases improves the above mentioned desorption of the sulfur dioxide from the secondary reaction zone.

The sulfur dioxide used in the process can be obtained from the sulfur containing gases from a pulp mill, and thus may constitute a part of the sulfur dioxide feed. Such sulfur containing effluent also contains minor amounts of hydrogen sulfide and organic sulfurous compounds which in normal amounts do not seem to affect the mixed acid adversely.

The vessel for the reaction between sulfur dioxide and chlorine, should be of the type permitting good contact between liquid and gaseous phases. As examples of suitable reactors can be mentioned packed bed towers, sieve or bell tray towers, falling film absorbers, spray or bubble reactors, intensive mixers, static mixers or stirred tank reactors.

The condensor should preferably be of the type permitting good contact between liquid and gaseous phases as well as providing sufficient area for heat transfer. As examples of suitable condensors can be mentioned: packed bed towers with external or internal cooling, falling film condensors, tubular heat exchangers, plate or frame heat exchangers, tray condensors or suitable combinations thereof.

In order to ensure that the mixed acid leaving the secondary reaction zone does not contain deleterious amounts of sulfur dioxide, the acid can be subjected to a continuous analysis of sulfur dioxide and chlorine. The analyser gives a signal to a regulator for the chlorine feed to the secondary reaction zone. In order to get satisfactory results with respect to crystallization of sodium sulfate in the presence of dichromate ions in the chlorine dioxide reactor, the amount of dissolved sulfur dioxide in the mixed acid should not exceed 0.1 percent by weight and most preferably not exceed 0.05 percent by weight.

According to another embodiment of the present invention, the primary reaction zone and secondary reaction zone are divided into two separate vessels. Chlorine is fed to the bottom of the vessel for the secondary reaction, i.e. the reaction of chlorine with the produced mixed acid containing dissolved sulfur dioxide. A portion of the mixed acid produced in the primary reaction zone is fed to the upper part or top of the vessel for the secondary reaction zone and is withdrawn from the bottom and directly forwarded to the chlorine dioxide reactor. The chlorine is added in excess in order to leave the vessel as a gaseous phase together with gaseous sulfur dioxide which is desorbed from the mixed acid. The gas stream is introduced in the lower part or bottom of the vessel in which the primary reaction takes place, i.e. the reaction between charged sulfur dioxide and chlorine.

Chlorine can be added to both the primary reaction zone and secondary reaction zone but it is also possible to add all chlorine only to the secondary reaction zone. The amount of chlorine added to the secondary reaction zone should be within 2-100% of the total chlorine feed.

The reaction in the secondary reaction zone is less exothermic, as the amount of sulfur dioxide is considerably lower in comparison to the primary reaction zone, and this means that the vessel can have a more simple design and no or simple means for cooling.

BRIEF DESCRIPTION OF THE DRAWINGS

The invention is further explained with reference to the accompanying drawing, which is a schematic flow sheet of one embodiment of the invention using a packed tower as a single reactor for the primary and secondary reaction and an indirect condenser.

DESCRIPTION OF PREFERRED EMBODIMENTS

In FIG. 1 the chlorine dioxide is generated continuously in a chlorine dioxide generator 1. The reactants are fed as aqueous solutions of sodium chlorate, sodium chloride, sulfuric acid and hydrochloric acid. The solution is maintained at the desired generator temperature by heating and pressure control.

The generator is operated at a pressure of about 100-400 mm Hg. The heating and pressure is adjusted in the generator in order to volatilize sufficient water to maintain the liquid level substantially constant by removing water of reaction and the excess water fed with the chlorate, chloride and acid solutions. Thus the temperature used can be from 30°-90° C. and preferably from 40°-85° C. The evaporative load on the reaction medium usually is such as to produce a weight ratio of steam to chlorine dioxide from about 4:1 to about 10:1. The steam removed with the chlorine dioxide and chlorine is sufficient to dilute the chlorine dioxide to a safe concentration thereby eliminating the danger of explosion. The acid normality of the reaction medium is ket within the interval of about 2 to about 4.8 and is adjusted by incorporation of mixed acid produced in reactor 6 and introduced in line 11 and by adding fresh acid, preferably sulfuric acid, in order to maintain the acidity in the generator solution. Precipitated sodium sulfate is removed from the reactor by line 13.

The generated gaseous mixture of chlorine dioxide and chlorine withdrawn from reactor 1 with the evaporated water, usually after cooling (not shown), is forwarded by line 2 to a chlorine dioxide absorption tower 3 to which water is added by line 4 to absorb the chlorine dioxide. Aqueous chlorine dioxide product, also containing dissolved chlorine, is withdrawn from the system at 14.

The residual chlorine is forwarded by line 5 to the bottom of reactor 6 which is a packed bed tower. The tower contains mixed acid solution which is descending the tower by gravity. Some chlorine is dissolved in the mixed acid solution and reacts in this secondary reaction zone with residual sulfur dioxide in the solution. Sulphur dioxide is introduced in line 7 at the bottom of the primary reaction zone. The reaction of sulfuric acid and hydrochloric acid is exothermic and the heat of reaction causes the mixed acid produced to boil. Water vapour, and hydrogen chloride, and optionally unreacted chlorine and sulfur dioxide, leave the tower by line 10' into the cooled condensate 15. The condensate is introduced into the reactor by 10". Fresh water is introduced into the condensor by line 12 in an amount corresponding to the amount of water consumed by the reaction and withdrawn as mixed acid at 8 and introduced by line 11 to the chlorine dioxide generator 1 and the amount vented off at 16 as steam.

Example

A laboratory equipment according to FIG. 1 was set up for reducing chlorine with sulfur dioxide in the presence of water. A mixed acid of hydrochloric acid and sulfuric acid was produced. The reactor was a packed 0.9 m tower which was isolated. On the top of the tower there was a condensor. The experiment was run at atmospheric pressure.

A gas mixture of sulfur dioxide, chlorine and air was charged in the bottom of the reactor and was countercurrently contacted with water which was charged at the top of the condensor.

The reactor was operated at boiling and the whole tower was approximately at a temperature of 105° C. except where the gas mixture was charged. The heat of reaction was removed by evaporative cooling and the condensate coming from the condensor was recharged to the packed tower.

Several experiments were run with different ratios of water and chlorine. In one experiment with the ratio between added water and chlorine of 5:1 and stoichiometric amounts of sulfur dioxide a mixed acid was produced containing 15 wt % hydrogen chloride and 20.4 wt % sulfuric acid. The tail gases had a content of chlorine, sulfur dioxide and hydrogen chloride of less than 1% of the charged gases. The temperature of the produced mixed acid was 70° C. The amount of condensate was 36% of the amount of water that was charged at the top of the condensor. The condensate contained 10.5 wt % hydrogen chloride and 4 wt % sulfuric acid.

What is claimed is:

1. A process for production of chlorine dioxide which comprises:
   (a) reacting in a chlorine dioxide generator sodium chlorate with chloride ions and sulfuric acid in an acid normality of about 2 to about 4.8 normal, said chloride ions being provided by hydrochloric acid or by a mixture of hydrochloric acid and sodium chloride, in proportions to generate chlorine dioxide,
   (b) maintaining said reaction medium at a temperature from about 50° C. to about 100° C.,
   (c) subjecting the reaction solution to a subatmospheric pressure sufficient to effect evaporation of water,
   (d) precipitating sodium sulfate from the reaction medium and removing it from the reaction zone,
   (e) withdrawing a mixture of chlorine dioxide, chlorine and water vapour and forming an aqueous solution of the chlorine dioxide and a gaseous chlorine stream therefrom,
   (f) forwarding at least part of said chlorine to a reactor to exothermically react with sulfur dioxide in the presence of water in order to produce a mixture of hydrochloric acid and sulfuric acid,
   (g) removing heat from said exothermic reaction by keeping the reactor at a temperature at or above the boiling point of the mixed acid produced and evaporating 0.15 to 0.35 parts by weight of water based on one part by weight of the produced mixed acid and condensing the vapour withdrawn from the reactor in a condenser,
   (h) introducing the condensed phase from the condenser to the top of the reactor,
   (i) withdrawing produced mixed acid at the bottom of the reactor and
   (j) introducing at least part of the produced mixed acid from step (i) into the chlorine dioxide generator.

2. A process according to claim 1 wherein the reactor for producing hydrochloric acid and sulfuric acid comprises a primary reaction zone and a secondary reaction zone, where
   (a) all sulfur dioxide is introduced into the lower part of the primary reaction zone which contains hydrochloric acid, sulfuric acid and chlorine, at least a portion of the chlorine coming from the secondary reaction zone, whereby sulfur dioxide and chlorine react to form hydrochloric acid and sulfuric acid, and
   (b) said mixed acid containing residual sulfur dioxide is forwarded to the secondary reaction zone and at least part of the chlorine fed is introduced into the lower part of said secondary reaction zone, whereby chlorine reacts with the sulfur dioxide and thereby reduces the sulfur dioxide content of the mixed acid.

3. A process according to claim 2, wherein the secondary reaction zone is contained in a separate vessel.

* * * * *